April 23, 1929.  W. H. VAN DUZER  1,709,925
BARREL TRUCK
Filed April 26, 1928
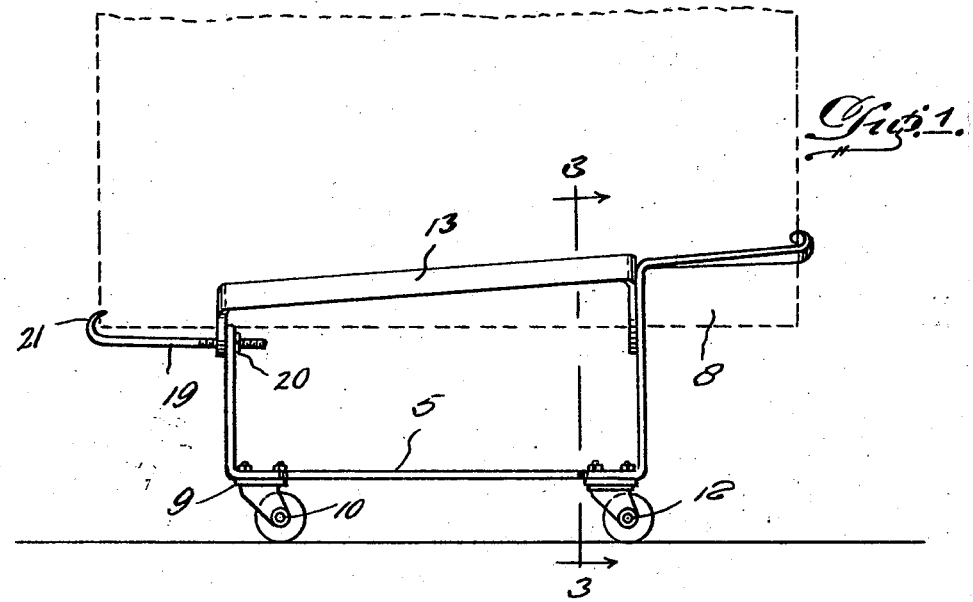
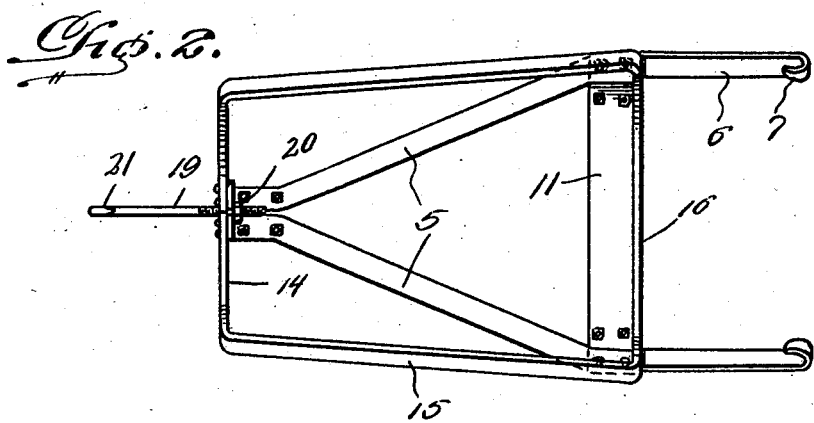
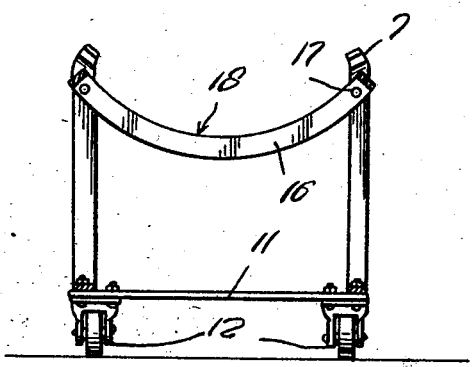
Inventor
W. H. Van Duzer
By Clarence A. O'Brien
Attorney Patented Apr. 23, 1929.

1,709,925

UNITED STATES PATENT OFFICE.

WILLIAM H. VAN DUZER, OF AMES, IOWA.

BARREL TRUCK.

Application filed April 26, 1928. Serial No. 272,975.

The present invention relates to hand trucks adapted particularly for use in the trucking of barrels and similar cylindrical containers and has for a principal object to provide a wheeled trucking frame having barrel end clamping means arranged at each end of the frame whereby to secure the barrel in mounted position upon the frame of the truck.

A further object of the invention is to provide means for adjusting the barrel clamping means at one end of the truck whereby to provide for the securing of containers or barrels of varying sizes upon the truck frame.

A still further object is to provide a truck of this character of a simple and practical construction, which is strong and durable, which may be attached to the barrel while in its vertically disposed position and adapted to form a carriage for the barrel and arranged in a horizontal position whereby to provide a convenient means for transporting the barrel and which at the same time is inexpensive to manufacture and otherwise well adapted for the purpose for which the same is intended.

Other objects and advantages reside in the special construction, combination and arrangement of the various elements forming the invention as more fully hereinafter described and claimed, reference being had to the accompanying drawings forming part hereof, wherein like numerals refer to like parts throughout, and in which:

Figure 1 is a side elevational view showing the truck in position for supporting the barrel thereon, Figure 2 is a top plan view, Figure 3 is a transverse sectional view taken substantially along the line 3—3 of Figure 1.

Referring now to the drawing in detail, the invention comprises a truck frame composed of a pair of substantially U-shaped frame members 5 having one end of each of said members provided with a longitudinal extension 6 with the extremity thereof formed into a hook 7, the extensions of the respective U-shaped members being disposed in spaced parallel relation at adjacent ends of said members so as to enable the hooks 7 to engage one end of a barrel or other container shown by the dotted lines at 8 and at opposite sides thereof.

The ends of the U-shaped members 5 remote from the extensions 6 converge toward each other and are attached to a common plate 9 on which a roller 10 is swivelly mounted. The ends of the U-shaped members provided with the extensions 6 are spaced apart and secured together by a transversely extending frame member 11.

At the under side of each end of the transversely extending member 11 is also mounted a roller 12, said rollers together with the roller 10 providing a wheeled mounting for the truck.

The ends of the frame members 5 are connected by a substantially horizontally disposed frame member 13 shaped generally in the form of a rectangle and constructed of a single strip of strap iron having its opposite ends bolted or otherwise fixedly secured respectively to the closely disposed ends of the frame members 5, said member 13 extending outwardly toward the sides of the truck and cooperating to form an end section 14 terminating at the sides in side sections 15 extending toward the opposite end of the frame and then extending transversely thereof to form the other end section 16. At the corners formed between the side sections 15 and the end section 16 the spaced apart ends of the U-shaped frame members 5 are suitably attached by rivets 17 or the like as shown in Figure 3 of the drawings.

The end sections 14 and 16 are curved downwardly to form saddles for receiving the curved portion of the barrel or other cylindrical container 8 to prevent the rolling of the barrel therefrom.

A threaded opening is formed in the end section 14 intermediate the sides thereof, said opening also extending between the adjacent edges of the U-shaped frame members 5 and through which is inserted a clamping bolt 19, the inwardly extending end of the bolt carrying a retaining nut 20 for securing the bolt in position on the end section 14.

The outer end of the clamping bolt is formed into a hook 21 for engaging the end of the barrel opposite from the hooks 7 whereby to secure the same in position upon the barrel.

It will be apparent from the foregoing that the parts entering into the construction of the truck are reduced to a minimum without sacrificing any of the desirable features in an article of this character, such as strength and ease of handling the same.

It is obvious that my invention is susceptible to various changes and modifications in construction without departing from the spirit of the invention or the scope of the appended claim, and I accordingly claim all such forms of the device to which I am entitled.

Having thus described my invention, what I claim as new is:

A barrel truck comprising a truck frame composed of a pair of U-shaped frame members having one end of each thereof disposed in spaced apart relation and their opposite ends secured adjacent to each other, an extension formed at the spaced ends of each of said members, and provided with barrel end engaging hooks, a rectangular member secured to the ends of said U-shaped frame members and having end sections formed into barrel saddles, a barrel engaging clamp adjustably carried at the end of the frame remote from said hooked extensions and wheels mounted on said U-shaped frame members.

In testimony whereof I affix my signature.

WILLIAM H. VAN DUZER.